United States Patent
Song et al.

[11] Patent Number: 6,010,723
[45] Date of Patent: Jan. 4, 2000

[54] METHOD FOR MANUFACTURING GUM BASE

[75] Inventors: Joo H. Song, Northbrook; Donald Townsend, Chicago, both of Ill.

[73] Assignee: The Wm. Wrigley Jr. Company, Chicago, Ill.

[21] Appl. No.: 08/809,016

[22] PCT Filed: Mar. 13, 1995

[86] PCT No.: PCT/US95/03009

§ 371 Date: May 12, 1997

§ 102(e) Date: May 12, 1997

[87] PCT Pub. No.: WO96/08158

PCT Pub. Date: Mar. 21, 1996

Related U.S. Application Data

[63] Continuation-in-part of application No. 08/126,319, Sep. 24, 1993, Pat. No. 5,562,936.

[51] Int. Cl.[7] ..................................................... A23G 3/30
[52] U.S. Cl. .................... 426/3; 426/4; 426/6; 426/516
[58] Field of Search .................... 426/3, 4, 5, 6, 426/516

[56] References Cited

U.S. PATENT DOCUMENTS

| | | |
|---|---|---|
| 3,795,744 | 3/1974 | Ogawa et al. . |
| 3,826,847 | 7/1974 | Ogawa et al. . |
| 4,187,320 | 2/1980 | Koch et al. . |
| 4,305,962 | 12/1981 | del Angel . |
| 4,386,106 | 5/1983 | Merritt et al. . |
| 4,515,769 | 5/1985 | Merritt et al. . |
| 4,555,407 | 11/1985 | Kramer et al. . |
| 4,590,075 | 5/1986 | Wie et al. . |
| 4,711,784 | 12/1987 | Yang . |
| 4,721,620 | 1/1988 | Cherukuri et al. . |
| 4,740,376 | 4/1988 | Yang . |
| 4,794,003 | 12/1988 | Cherukuri et al. . |
| 4,816,265 | 3/1989 | Cherukuri et al. . |
| 4,872,884 | 10/1989 | Cherukuri et al. ........................... 426/3 |
| 4,933,189 | 6/1990 | Cherukuri et al. . |
| 4,968,511 | 11/1990 | D'Amelia et al. . |
| 4,992,280 | 2/1991 | Chu et al. . |
| 5,045,325 | 9/1991 | Lesko et al. . |
| 5,135,760 | 8/1992 | Degady et al. . |
| 5,792,494 | 8/1998 | Kanca et al. ................................ 426/6 |

FOREIGN PATENT DOCUMENTS

| | | |
|---|---|---|
| 0273809 | 7/1988 | European Pat. Off. . |
| 2635441 | 2/1990 | France . |

*Primary Examiner*—Lien Tran
*Attorney, Agent, or Firm*—Hill & Simpson

[57] ABSTRACT

A continuous process of making a chewing gum base which provides a method for cooling at least certain sections of the mixer (extruder) in a cost effective and energy efficient manner. To this end, in an embodiment, a method of continuously compounding chewing gum base in an extruder comprising the steps of: feeding into the extruder the necessary components to create a desired gum base; and adding to the extruder, at a desired location, a gum base component, at ambient temperature, that has a sufficient thermal capacity to cool at least a portion of the contents of the extruder to a desired temperature.

5 Claims, 5 Drawing Sheets

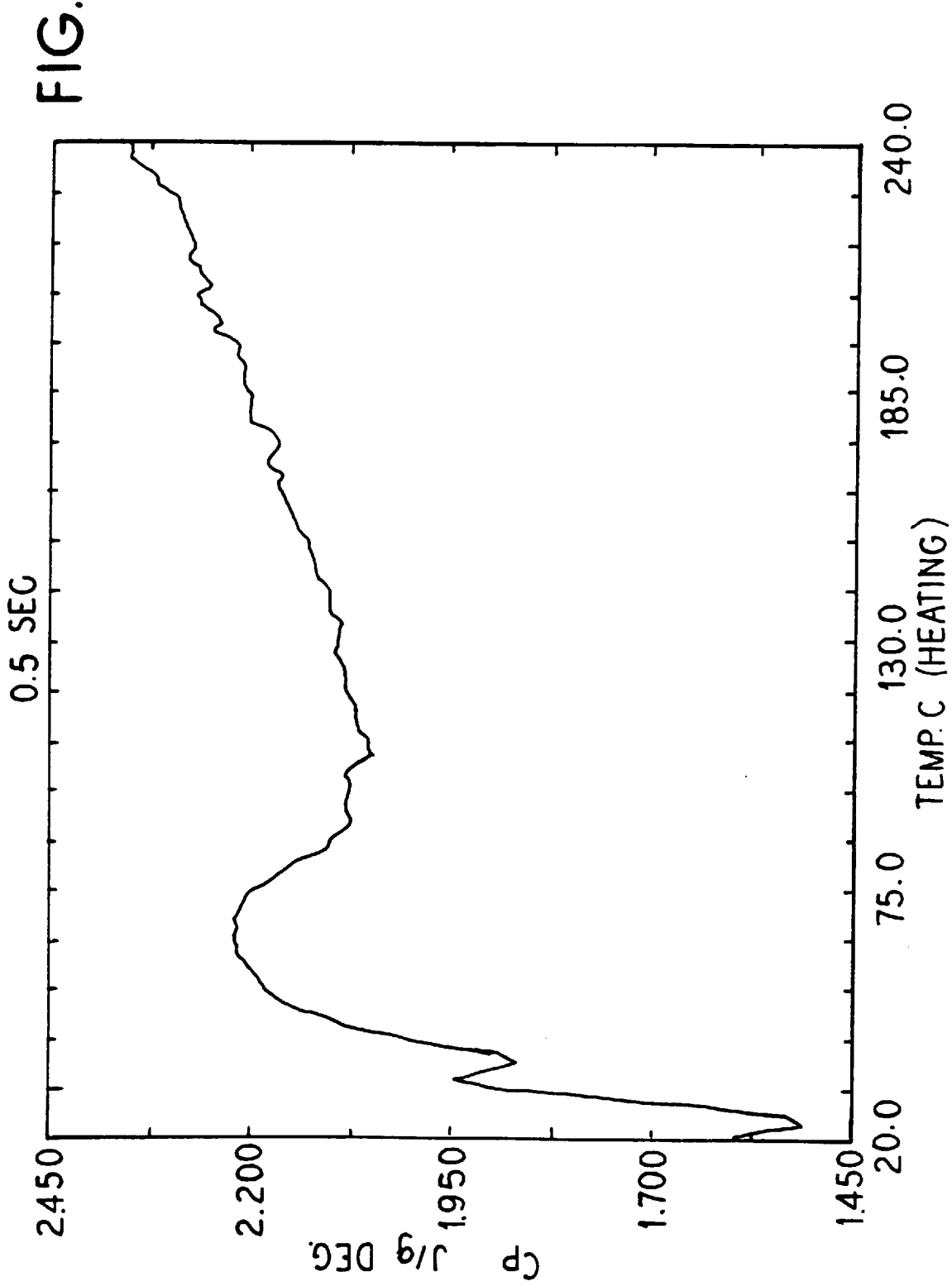

us 6,010,723

METHOD FOR MANUFACTURING GUM BASE

CROSS REFERENCE TO RELATED APPLICATIONS

The present invention is a continuation-in-part of U.S. Ser. No. 08/126,319, filed Sep. 24, 1993 now U.S. Pat. No. 5,562,936 and entitled: "Continuous Gum Base Manufacturing Using Highly Distributive Mixing," the disclosure of which is incorporated herein by reference. This application is a national stage filing of PCT/US95/03009 filed Mar. 13, 1995.

BACKGROUND OF THE INVENTION

The present invention relates to a continuous process for manufacturing chewing gum bases.

A typical chewing gum base includes one or more elastomers, one or more fillers, one or more elastomer solvents, plasticizers and optional plastic polymers, waxes, emulsifiers and miscellaneous colors, flavors and antioxidants. Due primarily to the difficulty in melting and dispersing the elastomers homogeneously among the other gum base ingredients, gum base manufacture has typically been a tedious and time-consuming batch process. For example, one such conventional process uses a sigma blade batch mixer having a front to rear blade speed ratio of about 2:1, and a mixing temperature of about 80–120° C.

In this conventional process, initial portions of elastomer, elastomer solvent and filler are added to the heated sigma blade mixer and blended until the elastomer is melted or smeared and thoroughly mixed with the plasticizer and fillers. Then the remaining portions of elastomer, elastomer solvent, plasticizer, fillers, emulsifiers and other ingredients are added sequentially, in a stepwise fashion, often with sufficient time for each stepwise addition to become completely mixed before adding more ingredients. Depending on the composition of the particular chewing gum bases and, in particular, the amount and type of elastomer, considerable patience may be required to insure that each ingredient becomes thoroughly mixed. Overall, anywhere from one to four hours of mixing time can be required to make one batch of chewing gum base using a conventional sigma blade mixer.

After mixing, the molten gum base batch must be emptied from the mixer into coated or lined pans, or pumped to other equipment such as a holding tank or a filtering device, then extruded or cast into shapes, and allowed to cool and solidify, before being ready for use in chewing gum. This additional processing and cooling requires even more time.

Various efforts have been undertaken to try to simplify and reduce the time required for gum base manufacture. European Patent Publication No. 0 273 809, in the name of General Foods France, discloses a process for making nonadhesive chewing gum base by blending elastomer and filler components together in a continuous mill to form a nonadhesive premix, dividing the premix into fragments, and blending the premix fragments and at least one other nonadhesive gum base component together in a powder mixer. Alternatively, the premix fragments and other base components can be added to an extruder along with other chewing gum components to accomplish direct manufacture of chewing gum.

French Patent Publication No. 2 635 441, also in the name of General Foods France, discloses a process for making a gum base concentrate using a twin screw extruder. The concentrate is prepared by mixing high molecular weight elastomers and plasticizers in desired proportions and feeding them into the extruder. Mineral fillers are added to the extruder downstream of the feed inlet of the elastomer/plasticizer blend. The resulting gum base concentrate has a high level of elastomers. The concentrate can then be mixed with the other gum base ingredients to provide a complete gum base.

U.S. Pat. No. 4,968,511, issued to D'Amelia et al., discloses that chewing gum can be made directly in a one-step compounding process (without making an intermediate gum base) if certain vinyl polymers are used as the elastomer portion.

U.S. Pat. No. 4,187,320, issued to Koch et al., discloses a three-stage process for making a chewing gum base in a mixing kettle.

U.S. Pat. No. 4,305,962, issued to del Angel, discloses a process for making an elastomer/resin masterbatch as a precursor to a gum base.

U.S. Pat. No. 4,459,311, issued to DeTora et al., discloses making gum base using two separate mixers—a high intensity mixer for pre-plasticizing the elastomer in the presence of a filler, followed by a medium intensity mixer for ultimately blending all the gum base components together.

Several publications disclose that a continuous extruder can be used to make chewing gum product after a separate process has previously been used to make the chewing gum base. These publications include U.S. Pat. No. 5,135,760, issued to Degady et al.; U.S. Pat. No. 5,045,325, issued to Lesko et al., and U.S. Pat. No. 4,555,407, issued to Kramer et al.

Notwithstanding the prior efforts described above, there is a need and desire in the chewing gum industry for a continuous process which can effectively and efficiently be used to make a variety of complete chewing gum bases without limiting the type or quantity of elastomer employed, and without requiring preblending or other pretreatment of the elastomer.

One of the problems encountered in using extruders, or similar mixers, to manufacture chewing gum base is due to difficulties with heat exchange. Certain gum ingredients must be heated to relatively high temperatures in order to be mixed with other ingredients. These temperatures may be higher than desirable for other areas in the mixing device.

Additionally, the mechanical shearing that is required during such mixing will also heat the mixer and product contained therein. This heat produced, in at least certain sections of the extruder, is not necessary downstream and may be detrimental. For example, temperatures of 180° C. and greater can be very damaging to at least certain gum base ingredients. However, dissipating the heat in the extruder is problematic.

SUMMARY OF THE INVENTION

The present invention provides a continuous process of making a chewing gum base which provides a method for cooling components contained in at least certain sections of the mixer (extruder) in a cost effective and energy efficient manner.

To this end, the present invention provides a method of continuously compounding chewing gum base in an extruder comprising the steps of: feeding into the extruder the necessary components to create a desired gum base; adding to the extruder at a desired location, a gum base component, at ambient temperature, that has a sufficient thermal capacity to cool at least a portion of the contents of the extruder to a desired temperature.

In an embodiment, the gum base component is polyvinyl acetate.

In an embodiment, the gum base component is added in an amount sufficient so that it comprises at least 10% of a resultant gum base that is created.

In an embodiment, the extruder includes at least a distributive mixing zone and a dispersive mixing zone.

In an embodiment, an elastomer and a filler are fed into the extruder before other components of the chewing gum base.

In an embodiment, the extruder includes a first dispersive mixing zone and the gum base component is added during the first dispersive mixing zone.

In an embodiment, the extruder is a high efficiency mixer.

In an embodiment, the extruder includes a blade-and-pin mixer.

In a further embodiment, a process is provided for making gum base comprising the steps of: adding an elastomer and filler to an extruder for continuously producing gum base; adding a gum base component that has a glass transition temperature that is less than a temperature of the elastomer and filler in the extruder but greater than the temperature of the component when added to the extruder; and continuously creating gum base.

In another embodiment, a method for producing gum base in an extruder is provided comprising the steps of: adding to an extruder that includes at least a first and second mixing zone ingredients necessary to make a desired gum base; adding to the extruder polyvinyl acetate at a temperature that is not greater than ambient temperature; and continuously creating a gum base.

In another embodiment, a process for continuously producing a chewing gum base using a single extruder is provided comprising the steps of: adding an elastomer and a filler into a continuous mixer; adding, as a solid, polyvinyl acetate to the continuous mixer; and discharging a resulting chewing gum base from the mixer.

The method of the present invention is suitable for use with any conventional gum base elastomer, in any conventional amount, without requiring preblending or pretreatment of the elastomer with any other ingredient. For instance, the present invention can be used for the continuous manufacture of a wide variety of gum bases which include many or all of the following components, in the following percentages:

| Component | Range (% by weight) |
|---|---|
| Elastomer(s) | 5.0–95 |
| Elastomer Solvent(s) | 0–50 |
| Plasticizer(s) | 0–75 |
| Wax(es) | 0–30 |
| Emulsifier(s) | 0.5–40 |
| Filler(s) | 1.0–65 |
| Colorant(s)/flavor(s) | 0–3.0 |

The present invention has several different aspects, which can be employed together, separately, or in any combination. All of these aspects can be performed together, in sequence, using a single continuous mixing process, for example, in a twin-screw extruder.

In an aspect of the method, the elastomer, elastomer solvent and filler are continuously mixed together under conditions of highly dispersive mixing. By "highly dispersive mixing" it is meant that the elastomer, elastomer solvent and filler are broken down into very small particles, droplets or "domains" which readily become dispersed among themselves and which can later be distributed, substantially homogeneously, among the other gum base ingredients. This dispersive mixing stage can be thought of as a disentanglement and "breaking down" stage for the gum base components which are the most difficult to disperse. Special mixing elements are used for this purpose, as discussed below.

In an aspect of the method, the chewing gum base ingredients are added sequentially to the continuous extruder, at different locations, in an order which approximately corresponds to a decreasing order of viscosity. The relatively high viscosity chewing gum base ingredients (for example, most elastomers) are added to the extruder first with filler and elastomer solvent, at an upstream location, and are mixed together. The filler and elastomer solvent help disperse the elastomer. In an embodiment, the intermediate viscosity gum base ingredients (for example, polyvinyl acetate, low molecular weight elastomers and elastomer solvents) are added to the extruder second, at an intermediate location, and are mixed with the high viscosity ingredients previously added. The relatively low viscosity gum base ingredients (for example, oils, fats and waxes) are added to the extruder third, at a downstream location, and are mixed with the high and intermediate viscosity ingredients previously added.

In an aspect of the method, the elastomer, elastomer solvent, filler, intermediate viscosity ingredients (for example, polyvinyl acetate) and, optionally, low viscosity ingredients (for example, fats, oils and waxes) are continuously mixed together under conditions of highly distributive mixing. By "highly distributive mixing" it is meant that the ingredients are spread out or "distributed" among each other to form a substantially homogeneous chewing gum base blend. By way of analogy, the "dispersive mixing" stage, described above, causes the elastomer, using the filler as a processing aid for dispersive mixing, to be "broken down" into very small particles, droplets or domains. The "distributive mixing" stage, which occurs further downstream in the continuous process, causes these very small particles, droplets or domains to become evenly distributed among the remaining gum base ingredients.

In an aspect of the method, volatile components of the gum base mixture can be continuously removed during the extrusion process. These volatile components include unwanted degradation products; for example, degraded elastomer, elastomer solvent or plasticizer, which occur in small amounts from the mixing process. Removal of the volatile components helps eliminate undesirable off-notes from the flavor of the chewing gum base. This can be accomplished, for example, by pulling a vacuum on the extruder at selected locations. If the degradation products are not removed periodically and are allowed to mix with the base ingredients, they may become very difficult to remove from the base.

In an aspect of the method, certain ingredients may be injected in a liquid state under pressure, using a pump. The liquid state can be achieved by premelting an ingredient such as wax, or by lowering the viscosity of a fat or oil, using one or more heated feed tanks. The injection of a liquid under pressure may facilitate more precise metering and better mixing and distribution of certain low and medium viscosity ingredients.

The invention has numerous advantages. First, chewing gum base is produced in a continuous process. If desired, the output can be used to supply a continuous chewing gum production line. Second, the average residence time for gum base ingredients is reduced from hours to minutes. Third, all of the necessary addition and compounding steps can be performed in sequence using a single continuous mixing apparatus. Fourth, the preferred embodiment provides for an energy efficient method of reducing the temperature of the extruder at certain locations in the mixing process. Fifth, the invention is effective for a wide range of gum base compositions, including different gum base elastomers and elastomer percentages, without requiring preblending or other pretreatment of the elastomers. Sixth, the gum base can be produced on demand, eliminating finished base inventory. This allows maximum flexibility to react to market demands and formula changes.

The foregoing and other features and advantages of the invention will become further apparent from the following detailed description of the presently preferred embodiments, read in conjunction with the accompanying examples and drawings.

BRIEF DESCRIPTION OF THE DRAWINGS

FIG. 7 depicts a differential scanning calorimeter graph of heat capacity versus temperature of low molecular weight polyvinyl acetate.

DETAILED DESCRIPTION OF THE DRAWINGS AND PREFERRED EMBODIMENTS OF THE INVENTION

Figure 1:
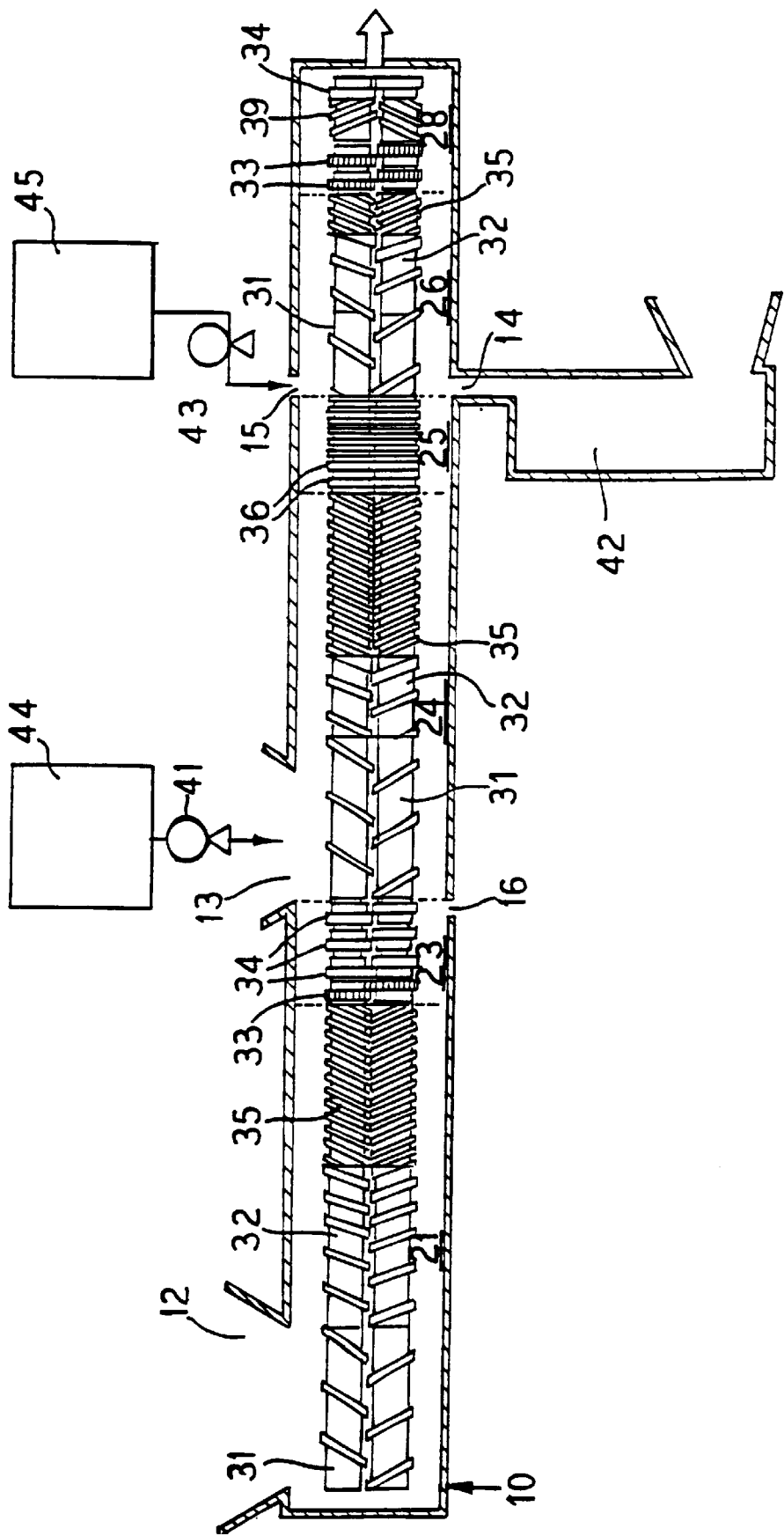
FIG. 1 depicts a schematic representation of a twin screw extruder set up for use in practicing the present invention.

The present invention provides improved methods for continuously producing gum base. Pursuant to the method, a component that has a sufficient thermal capacity is added, in sufficient volume, to the extruder to cool at least certain sections of the extruder. Preferably, a component that has a glass transition temperature that is less than the temperature of certain ingredients in a certain section of the extruder is added to the extruder to cool the ingredients in the extruder.

Due to its thermal capacity, the component dissipates the heat and reduces the temperature of the ingredients in the extruder. This prevents temperatures in the extruder that will degrade and damage the base ingredients and provides an energy efficient process. In a preferred embodiment, the component is polyvinyl acetate that is preferably added at a temperature that is not greater than ambient temperature.

The chewing gum base made by the process of the present invention can be made into conventional chewing gums, including bubble gum, by conventional methods. The details of such chewing gums and methods of production are well known and therefore not repeated in detail herein. Of course, specialized chewing gum, such as nonadhesive chewing gum and bubble gum, will use specialized gum base formulas and ingredients. However, those gum base ingredients can be combined using the processes herein described.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5–15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5–95% by weight of the chewing gum, more typically 20–80% by weight of the chewing gum and most coummonly 30–60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present and are commonly used with sugarless sweeteners. When used, high intensity sweeteners typically constitute between 0.001–5% by weight of the chewing gum, preferably between 0.01–1% by weight of the chewing gum. Typically, high intensity sweeteners are at least 20-times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may also provide additional sweetness such as with aqueous sugar or alditol solutions.

Flavoring agents should generally be present in the chewing gum in an amount within the range of about 0.1–15% by weight of the chewing gum, preferably between about 0.2–5% by weight of the chewing gum, most preferably between about 0.5–3% by weight of the chewing gum. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

Optional ingredients such as colors, emulsifiers, pharmaceutical agents and additional flavoring agents may also be included in chewing gum.

The insoluble gum base generally comprises elastomers, elastomer solvents, plasticizers, waxes, emulsifiers and inorganic fillers. Plastic polymers, such as polyvinyl acetate, which behave somewhat as plasticizers, are, pursuant to the present invention, preferably, included. Elastomers may include polyisobutylene, butyl rubber (isobutylene-isoprene copolymer) and styrene butadiene rubber, as well as natural latexes such as chicle. Elastomer solvents are often resins such as terpene resins and ester gums. Plasticizers are typically fats and oils, including tallow, hydrogenated and partially hydrogenated vegetable oils, and cocoa butter. Commonly employed waxes include paraffin, microcrystalline and natural waxes such as beeswax and carnauba.

The gum base typically also includes a filler component. The filler component may be calcium carbonate, magnesium carbonate, talc, dicalcium phosphate or the like. The filler may constitute between about 5 and about 60 percent by weight of the gum base. Preferably, the filler comprises about 5 to about 50 percent by weight of the gum base.

Emulsifiers, which also sometimes have plasticizing properties, include glycerol monostearate, lecithin and glycerol triacetate. Further, gum bases may also contain optional ingredients such as antioxidants, colors and flavors.

The insoluble gum base may constitute between about 5 to about 80 percent by weight of the gum. More typically the insoluble gum base comprises between 10 and 50 percent by weight of the gum and most often about 20 to about 35 percent by weight of the gum.

Pursuant to the present invention, the gum base is made in continuous process, preferably using a single extruder. In a preferred embodiment, the gum base is made using at least two mixing zones. patent application Ser. No. 08/793,887, being filed on even date herewith, entitled: "METHOD FOR CONTINUOUS GUM BASE MANUFACTURING," the disclosure of which is hereby incorporated by reference, discloses a number of possible methods and embodiments that can be used to make gum base using a single extruder.

In an embodiment, the present invention is carried out on a twin screw extruder such as depicted schematically in FIG. 1. The twin screw extruder will be set up with several different feed inlet locations where chewing gum base ingredients can be added. The screws inside the barrel of the extruder are equipped with different types of elements along the length of the screws. The different sections are sometimes referred to as processing sections, and described by the type of elements employed in the sections. The barrel for the extruder is typically divided into regions that may be heated or cooled independent of other regions. These heating regions normally coincide with processing sections, depending on the lengths of the barrel zone sections and the elements in the processing sections.

While different equipment manufacturers make different types of elements, the most common types of elements include conveying elements, compression elements, reverse elements, homogenizing elements such as shearing disks and toothed elements, and kneading disks and blocks. Conveying elements generally have flights spiraling along the elements with wide gaps between the flights. These elements are used at feed inlet sections to quickly move material into the body of the extruder. Compression elements have flights with a pitch that narrows as the material moves along the flights. This results in compression and high pressure in the forward direction, which is required to force material downstream and through the other elements. Reverse elements have flights that are angled opposite those of the conveying elements. The flights rotate in a direction that would force material upstream. These elements provide a high back pressure and slow down movement of the material through the extruder. Of course, the extruded material still works its way opposite the flights to move downstream through the reverse elements. A reverse helical arrangement of kneading blocks can accomplish a similar result.

Figure 2:
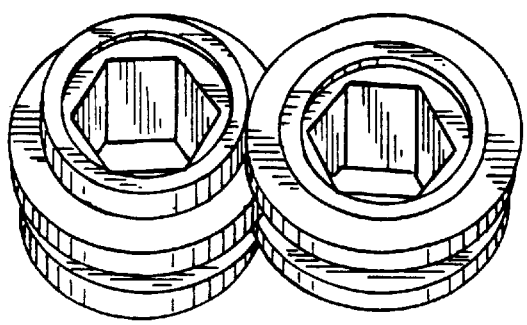
FIG. 2 depicts a set of shearing disks used in the extruder of FIG. 1.
Figure 3:
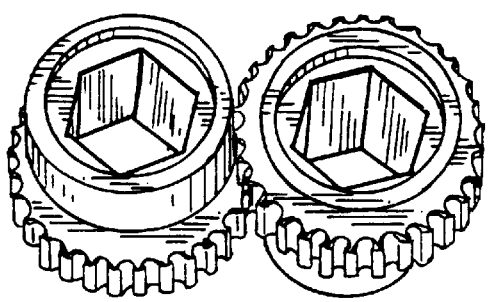
FIG. 3 depicts a set of toothed elements used in the extruder of FIG. 1.
Figure 4:
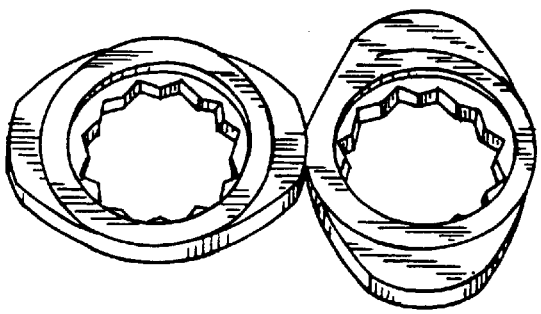
FIG. 4 depicts a set of kneading disks used in the extruder of FIG. 1.
Figure 5:
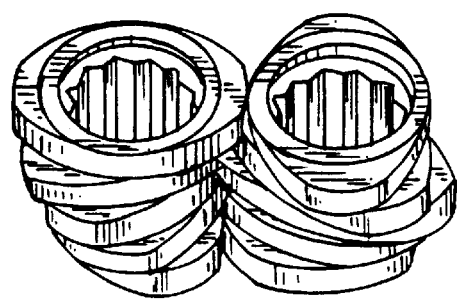
FIG. 5 depicts a plurality of kneading disks, set up in a helical fashion, to form kneading blocks.

Shearing disks, as their name implies, impart high shearing forces on the material in the extruder, resulting in highly dispersive mixing. In a twin screw extruder, the shearing disks opposite one another on the two different screws have close fitting disk/slot elements, as depicted in FIG. 2. Toothed elements, as depicted in FIG. 3, have gear-like teeth that oppose a cylindrical spacer shaft on the other screw. Toothed elements impart highly distributive mixing. Often the toothed elements are made in matched sets, with a cylindrical shaft portion and a toothed portion as one unit. Kneading disks, as shown in FIG. 4, have an elliptical shape, and produce a kneading action in the material passing through the extruder. Often a plurality of kneading disks will be placed next to each other in a helical arrangement, as shown in FIG. 5, referred to as kneading blocks.

Highly distributive mixing can also be accomplished using reverse conveyance elements that have portions missing from the flights to allow flow counter to the direction of compression. These missing portions may be arranged as a groove through the flights cut parallel to the length of the element. Also, kneading blocks followed by reverse conveyance elements, to build up high back pressure, also produce highly distributive mixing.

These elements, and other elements useful in twin screw extruders, are well known in the art and are commercially available. The elements are often specifically designed for the different types of commonly available twin screw extruders, which include co-rotation, counter rotation, intermeshing and tangential twin screw extruders. Elements intended for similar functions will vary in design depending on the type of extruder for which they are intended.

One specific type of element for a specific brand of extruder is a non-intermeshing polygon element sold by the Farrel Corporation, 25 Main Street, Ansonia, Conn. 06401, for the Farrel-Rockstedt co-rotating twin screw extruder. It is believed that the non-intermeshing polygons produce dispersive mixing.

In embodiments of the invention, the dispersive mixing disentangles the elastomers with a minimum amount of degradation of the polymer chains. Thus, while dispersive mixing will inevitably reduce the molecular weight of the polymer, it may be preferable to control the dispersive mixing operation to minimize this molecular weight reduction. Preferably, the average molecular weight will not be reduced below the average molecular weight of the same polymers mixed into gum base using conventional processes. However, a controlled amount of molecular weight reduction may be desirable to optimize the chewing texture of the final product.

An adequate dispersive mixing will produce a smooth, rubbery fluid, with no detectable lumps of rubber. If only a few lumps of rubber are present they may be screened out or dispersed during subsequent mixing steps. However, if the number or size of lumps is excessive, or the processed elastomers and fillers are in the form of an agglomeration or grainy mass, the dispersive mixing applied is inadequate.

The distributive mixing should be sufficient to produce a homogeneous gum base, rather than a material that appears to be "sweating", or that has a marbled or swiss cheese texture. In the preferred embodiment of the invention, the highly distributive mixing is sufficient to incorporate plasticizers, particularly fats, oils and waxes, to the same degree these plasticizers are incorporated in conventional chewing gum base manufacturing processes.

As previously noted, pursuant to the present invention, a method for effective heat exchange in the mixer (extruder) is provided that allows ingredients in the extruder to be cooled, at at least certain locations in the extruder, so as to provide a method of continuously producing chewing gum base.

Typically, elastomers and resins will be introduced in the extruder in a first section of the extruder. In an embodiment, these components will be subjected to dispersive mixing. At the outset, it should be noted that in order to inject these components, it is necessary to heat these components to a relatively high temperature. Additionally, due to the shearing action in the dispersive zone, a large amount of heat is generated in the extruder in this area.

Although this heat may be necessary in the first section of the extruder, the heat is not required in subsequent sections or for subsequent mixing of ingredients in the extruder and induced may be detrimental. For example, the resin and elastomers will typically be at a temperature of approximately 160° C. at this section in the extruder. However, at temperatures of above 180° C., the gum base components can be damaged and degraded.

Pursuant to the present invention, heat is dissipated by adding to the extruder a component having a high thermal capacity. This component is a chewing gum base ingredient that is added, preferably as a solid, and in sufficient volume to dissipate a sufficient amount of heat. Preferably, the component is added at ambient conditions (without being heated). However, if desired, the component could be cooled before it is added.

Preferably, the component is one that has a glass transition temperature that is lower than the temperature of the elastomer and filler contained within the first zone of the extruder. Thus, the component will absorb and dissipate a large amount of heat cooling the chewing gum base contained within the extruder.

In a preferred embodiment, polyvinyl acetate is utilized as the component to cool the extruder. Polyvinyl acetate has a large thermal capacity. In a typical chewing gum base, polyvinyl acetate accounts for at least approximately 20% of the composition. Additionally, the polyvinyl acetate has a glass transition phase change at 20° to 75° C. which is less than the temperature of the ingredients in the extruder.

If desired, the polyvinyl acetate can be added with other components such as certain resins, colors, or other base ingredients. Likewise, it may be desirable to add more than one type of polyvinyl acetate due to the chewing gum base being created.

Preferably, the polyvinyl acetate is added in a pellet form having a size of less than one inch. In a preferred embodiment, polyvinyl acetate is added in a pellet form having a size of ⅛ of an inch or less.

The component for cooling the extruder can be added at any desired section of the extruder. For example, the component can be added at the end of the dispersive zone. This will allow the component to cool the ingredients in the extruder before other more temperature sensitive ingredients are added. However, the component for cooling can be added downstream of the dispersive zone, for example, immediately after the dispersive zone.

As shown in FIG. 1, for practicing an embodiment of the invention, a twin screw extruder 10 is set up with a first feed inlet location 12 adjacent a first processing section 21 fitted with conveying elements 31, conveying and compression elements 32 and compression elements 35. The second processing section 23 is equipped with a combination of toothed elements 33, as depicted in FIG. 3, and several sets of shearing disks 34, as depicted in FIG. 2. At the end of the second processing section 23 the extruder 10 is equipped with a port 16 which is connected to a vacuum source (not shown). The third processing section 24 contains additional conveying elements 31, conveying and compression elements 32 and compression elements 35. A second feed inlet 13 is provided in the extruder adjacent this second set of conveying elements 31, for feeding additional gum base ingredients into the third processing section 24. Feed inlet 13 allows for the addition of powdered ingredients as well as liquid ingredients from pump 41. The fourth processing section 25 is fitted with kneading disks 36. At the beginning of the fifth processing section 26, the twin screw extruder 10 has another inlet 15 connected to a pump 43 and a feed inlet 14 in the form of a port connected to a side feeder 42, which may be a single or twin screw extruder, or even a gear pump which can generate high pressure. The fifth processing section 26 is fitted with conveying elements 31, conveying and compression elements 32 and compression elements 35, which force the gum base ingredients into the sixth and final processing section 28. Section 28 contains two sets of toothed elements 33, followed by reverse elements 39 and shearing disks 34. After passing through the shearing disks 34, the gum base ingredients exit the extruder 10.

It may be preferable to heat some of the ingredients, either to melt them or lower their viscosity. As shown in FIG. 1, the extruder 10 may be set up with heated tanks 44 and 45, connected respectively to pumps 41 and 43, for this purpose. Other commonly used equipment, such as equipment to monitor the temperature and heat or cool the extruder, is not shown in FIG. 1. The equipment will also include conventional weighing and feeding devices for continuously adding granulated or powdered ingredients at a controlled, monitored rate.

It will be understood that FIG. 1, as a schematic representation, shows the various components in their respective order from the standpoint of flow through the extruder 10. Typically the screws are mounted in a horizontal side-to-side position and feed inlets, especially those open to the atmosphere like the inlet 12 and 13, are placed vertically above the screws.

While the arrangement of FIG. 1 may be desirable for particular gum bases outlined in the examples below, other arrangements may be preferred for other gum bases. FIG. 1 depicts an extruder with three general areas of ingredient addition and six processing sections. For some gum bases, two, four or more ingredient feeding sections may be used, with different numbers of processing sections. FIG. 1 also depicts the use of one set each of long conveying elements 31, conveying and compression elements 32 and compression elements 35 in the first processing section 21, a short set of conveying and compression elements 32 in sections 24 and 26, and a short set of conveying elements 31 and compression elements 35 in section 26. In reality, one, two or more elements of different types and length may be used in these sections. FIG. 1 also depicts one set of toothed elements 33 and three sets of shearing disks 34 in section 23, but different numbers of these elements, or different elements all together, may be used. Likewise in sections 25 and 28, different types of elements that produce distributive mixing may be used, dependent on the gum ingredients being mixed in those sections and the type of extruder being used.

As has been previously noted, other extruders and methods can be used to make gum base in a continuous manner using a single extruder. U.S. patent application Ser. No. 08/136,589, filed on Oct. 14, 1993, entitled: "Continuous Gum Base Manufacturing Using a Mixing Restriction Element," the disclosure of which is hereby incorporated by reference, discloses an extruder including mixing restriction elements. The disclosed extruders can be used to create gum base pursuant to the present invention.

In a preferred embodiment, a high efficiency continuous mixer is used. A high efficiency mixer is one which is capable of providing thorough mixing over a relatively short distance of length of the mixer. This distance is expressed as a ratio of the length of a particular active region of the mixer screw, which is composed of mixing elements, divided by the maximum diameter of the mixer barrel in this active region. In a preferred embodiment, the L/D is less than approximately 40 and most preferably, less than approximately 25 L/D.

An example of a single high efficiency mixer that can be used is a blade-and-pin mixer. The blade-and-pin mixer uses a combination of selectively configured rotating mixer blades and stationary barrel pins to provide efficient mixing over a relatively short distance. A commercially available blade-and-pin mixer is the Buss kneader, manufactured by Buss AG in Switzerland, and available from Buss America, located in Bloomingdale, Ill.

Blade-and-pin mixers and methods of using same are disclosed in U.S. patent application Ser. No. 08/362,254, filed on Dec. 22, 1994, and entitled: "Total Chewing Gum Manufacture Using High Efficiency Continuous Mixing," the disclosure of which is incorporated herein by reference. The extruders and mixers disclosed therein can be used to create gum base pursuant to the present invention.

Figure 6A:
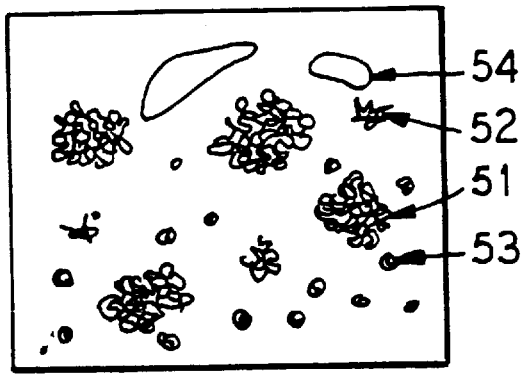
FIGS. 6a–e depict schematic sequential representations of gar base ingredients during the mixing process.
Figure 6B:
Figure 6C:

FIGS. 6a–e represent the state of various gum base ingredients as they are, in an embodiment, compounded into chewing gum base. At the beginning, as shown in FIG. 6a, the high molecular weight elastomer 51 and medium molecular weight elastomer 52 are both in the form of granules or particles in which the elastomer molecules are tightly bound together. The filler 53 is in particulate form, but may not be homogeneously mixed with the elastomers 51 and 52. The elastomer solvent 54 may be present in the form of droplets. As mixing begins, depicted in FIG. 6b, the elastomer solvent 54 becomes associated with the elastomers 51 and 52. With the presence of the filler 53, elastomer solvent 54 and heat, the granules begin to come apart into individual elastomer molecules. Also, the filler 53 becomes more evenly distributed, and may have its particle size reduced. As the process continues, the elastomers 51 and 52 become disentangled, as shown in FIG. 6c. This disentangling is the result of subjecting the elastomers 51 and 52 to highly dispersive mixing.

Figure 6D:
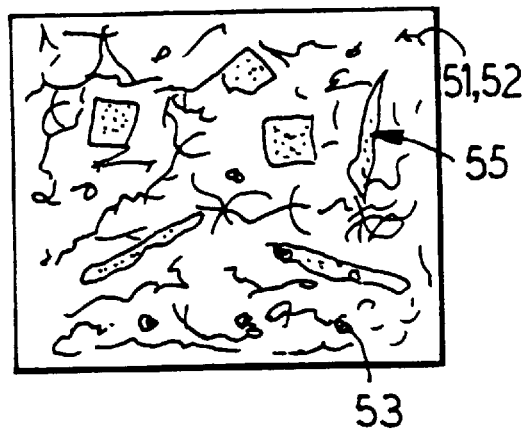

In an embodiment, after this step, the polyvinyl acetate 55, may be added, as shown in FIG. 6d. Initially, this material will also be in discrete particles. The addition of this material, due to its thermal capacity will cool the components that were previously added to the extruder. Of course, as stated previously, the polyvinyl acetate can be added at a different section of the extruder.

Figure 6E:
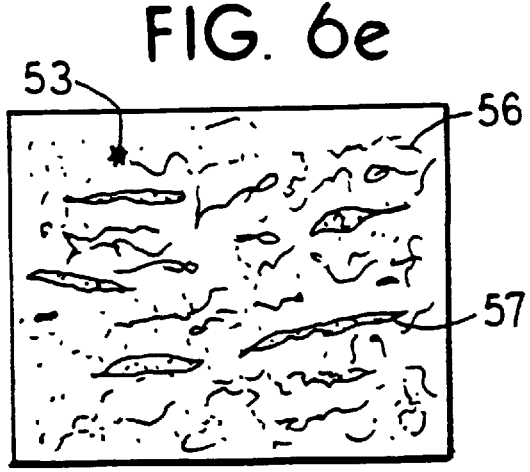

Further mixing and further ingredient additions, such as waxes 56 and emulsifiers 57, are subjected to distributive mixing, as depicted in FIG. 6e. Continued highly distributive mixing produces a homogeneous chewing gum base, wherein discrete particles or droplets are not detectable by sensory perception.

The elastomer may be added at the first feed inlet 12 along with elastomer solvent such as resins and the filler. However, especially lower weight elastomers may be added at least partially at the second feed inlet 13. Portions of the filler may also be added at the second feed inlet 13. Polyvinyl acetate may be added via a powder feeder, at the feed inlet port 14, while melted fats and waxes and oils are added at the last feed inlet 15. This will result in the filler, elastomer and plasticizer being subjected to highly dispersive mixing first before lower viscosity ingredients are added. The toothed elements 38, reverse elements 39 and shearing disk 40 after feed inlet 15 result in highly distributive mixing of all of the low viscosity gum base ingredients with the other gum base ingredients.

A preferred small scale extruder is a model LSM 30.34 counter-rotational, intermeshing and tangential twin screw extruder from Leistritz, Nurenberg, Germany. Other acceptable twin screw extruders include the Japan Steel Works Model TEX30HSS32.5PW-2V intermeshing co- and counter-rotating twin screw extruder, also known as the Davis Standard D-Tex Model, distributed by Crompton & Knowles Corporation, #1 Extrusion Dr., Pawcatuck, Conn. 06379, and either the co-rotating or counter-rotating intermeshing twin screw extruders from Werner & Pfleiderer Corporation, 663 E. Crescent Ave., Ramsey N.J. 07446. It is preferred to have a long barrel length. A Werner & Pfleiderer co-rotational twin screw extruder can go up to a length to diameter (L/D) ratio of 58. The Japan Steel Works Model TEX30HSS32.5PW-2V extruder may be eguipped to have an L/D of 48.

EXAMPLE 1

Gum base was made on a continuous basis using a Leistritz model LSM 30.34 counter-rotational, intermeshing and tangential extruder in intermeshing mode with a barrel diameter of 30.3 mm set up with the following elements (given in order proceeding from first feed inlet to the output end of the extruder and using the Leistritz part designation for each element):

| | |
|---|---|
| FF-1-30-120 | (conveying element) |
| KFD-1-30/20-120 | (conveying and compression element) |
| FD-3-30-120 | (compression element) |
| ZSS-2-R4 | (toothed element) |
| ZSS-2-R4 | |
| KS | (shearing disk) |
| KS | |
| FF-1-30-120 | |
| KFD-1-30/20-120 | |
| FD-3-30-120 | |
| ZSS-2-R4 | |
| ZSS-2-R4 | |
| ZSS-2-R4 | |
| KS | |

The die at the end of the extruder had a 1 mm hole.

The extruder had two feeding zones, each one adjacent the FF-1-30-120 conveying elements. A powder blend of ground butyl rubber, calcium carbonate and terpene resin at a ratio of 6:23:17 was fed at a rate of 3 kg/hr in the first feed zone. Polyisobutylene at 50–80° C. was also fed at the first feed zone at a rate of 0.39 kg/hr. A powder blend of 5 parts glycerol monostearate, 8 parts hydrogenated cottonseed oil, 5 parts hydrogenated soybean oil, 3 parts high molecular weight polyvinyl acetate and 21 parts low molecular weight polyvinyl acetate was fed into the second feeding zone at a rate of 2.74 kg/hr, along with a blend of 3 parts partially hydrogenated soybean oil and 3 parts lecithin heated to 30°

C. and fed at a rate of 0.4 kg/hr. The temperature of the extruder housing during operation was as follows:

| Zone | 1 | 2 | 3 | 4 | 5 | 6 | 7 | Die |
|---|---|---|---|---|---|---|---|---|
| Set Temperature | 90° C. | 90° C. | 95° C. | 130° C. | 130° C. | 130° C. | 110° C. | |
| Actual Temperature | 90° C. | 99° C. | 95° C. | 130° C. | 130° C. | 130° C. | 110° C. (est.) | 115° C. (est.) |

The extruder was operated at a speed of 100 rpm and drew 9 amps. A chewing gum base was produced which had no rubber particles or segregated oil. However, some of the polyvinyl acetate was not fully incorporated. This would be incorporated as the base was used to make chewing gum.

EXAMPLE 2

The same extruder set up and temperatures as used in Example 1 were used to continuously make another chewing gum base. A powder blend of ground butyl rubber and calcium carbonate at a ratio of 15:31 was fed into the first zone at a rate of 3 kg/hr, along with polyisobutylene heated to 50–80° C. and fed at a rate of 2.08 kg/hr. A powder blend of 22 parts low molecular weight polyvinyl acetate, 13 parts hydrogenated cottonseed oil, 3 parts glycerol monostearate and 13 parts hydrogenated soybean oil was fed into the second feed inlet at a rate of 6.63 kg/hr, along with partially hydrogenated soybean oil heated to 30–60° C. and fed at a rate of 1.3 kg/hr. The extruder was operated at 100 rpm, and drew 7–8 amps. A complete chewing gum base was prepared, although it was not as well mixed as the base of Example 1 and there were difficulties in material accumulating at the second feed zone.

EXAMPLE 3

An Leistritz Model 30.34 twin screw extruder is setup as shown in FIG. 1, with the following elements (the numbers to the left in parenthesis represent reference numbers from FIG. 1):

(31) FF-1-30-120
(32) KFD-1-30/20-120
(35) FD-3-30-120
(33) ZSS-2-R4
(34) KS
(34) KS
(34) KS
(31) FF-1-30-120
(32) KFD-1-30/20-60
(35) FD-3-30-120
(36) 18 kneading disks, stacked in 2 sets of 2 and 4 sets of 3, with a 900 set off between each set.
(31) FF-1-30-60
(32) KFD-1-30/20-60
(35) FD-3-30-30
(33) ZSS-2-R4
(33) ZSS-2-R4
(39) FF-1-30-30 (set up for reverse operation)
(34) KS The overall length of these elements is 1060 mm, giving a L/D for a 30.3 mm barrel of about 35.

The following ingredients are added at the following rates to the extruder 10 at the locations specified. The rates listed are for steady state operation.

| INGREDIENTS | % BY WEIGHT | FEED INLET LOCATION |
|---|---|---|
| Terpene resin (123° F. melting point) | 8.390 | 12 |
| Terpene resin (85° F. melting point) | 8.257 | 12 |
| Cocoa powder (<75 micron wet particle size) | 0.599 | 12 |
| Ground isobutylene-isoprene copolymer (120,000–150,000 MW, 2–7 mm diameter particle size) | 8.390 | 12 |
| Calcium carbonate (<12 micron particle size) | 20.908 | 12 |
| Polyisobutylene (12,000 M.W.) (heated to 100° C.) | 5.860 | 13 |
| Polyvinyl acetate (50,000–80,000 M.W.) | 2.663 | 14 |
| Polyvinyl acetate (25,000 M.W.) | 21.309 | 14 |
| Glycerol monostearate | 4.794 | 15 |
| Hydrogenated soybean oil | 4.528 | 15 |
| Lecithin | 3.329 | 15 |
| Hydrogenated cottonseed oil | 7.724 | 15 |
| Partially hydrogenated cottonseed oil | 3.196 | 15 |
| BHT | 0.053 | 15 |

The total feed rate is 25 lb/hr. The temperature is controlled so that the mixture is at about 115° C.–125° C.

While the examples have been given for relatively small scale operations, the process is readily scaled up. When using twin screw extruders, scale up is accomplished by using a larger barrel diameter, such as 6 inches, and a longer length, but maintaining the same L/D ratio. For an L/D of 45, a 6 inch barrel would be 22.5 feet in length. If larger machines generate more heat than can easily be removed, the rpm of the extruder may need to be reduced, or cooled shafts and mixing elements could be used. Also, by putting in some of the resin at the first feed zone, the heat generated during mixing should be reduced.

When conducting the experiment relating to Example 1, the polyisobutylene was originally added at the second feed inlet. This was possible during startup, but when the blend of fats and polyvinyl acetate were also added, the fats melted and lubricated the screws so that they no longer drew in the polyisobutylene. This is why the polyisobutylene is introduced at the first feed zone in Example 1.

In Examples 1 and 2, since the butyl rubber was ground before it was used, a portion of the filler and the ground butyl rubber were premixed (at a ratio of filler to butyl rubber of 1:3) to help keep the ground butyl rubber in a form that allowed it to be fed into the extruder as a powder blend. This filler was included in the overall ratios cited in the examples.

EXAMPLE NO. 4

A BUSS Kneader having a 100 mm barrel diameter and an overall active mixing L/D of 15 was used to manufacture a gum base. The mixer included an initial feed section and four mixing sections. The sections include four possible large feed ports which can be used to add major (e.g. solid) ingredients to the mixer. The third mixing section is also configured with two smaller liquid injection ports which are used to add liquid ingredients. The liquid injection ports include special barrel pins formed with hollow centers. Barrel pins are preferably present in most or all of the available locations, in all three rows. The first section of the mixer provides a dispersive mixing zone and the remaining sections provide a distributive mixing zone.

The presently preferred configuration of the mixing screw for most gum base products is as follows. The initial feed section is configured with about 1-⅓ L/D of low shear elements. The L/D of the initial feed section is not counted as part of the overall active mixing L/D of 15, discussed above, because its purpose is merely to convey ingredients into the mixing sections.

The first mixing section is configured with two low shear mixing elements followed by two high shear elements. The two low shear mixing elements contribute about 1-⅓ L/D of mixing, and the two high shear mixing elements contribute about 1-⅓ L/D of mixing. The first mixing section has a total mixing L/D of about 3.0, including the end part covered by a 57 mm restriction ring assembly with cooperating on-screw elements.

The restriction ring assembly with cooperating on-screw elements straddling the end of the first mixing section and the start of the second mixing section, have a combined L/D of about 1.0, part of which is in the second mixing section. Then, the second section is configured with three low shear mixing elements and 1.5 high shear mixing elements. The three low shear mixing elements contribute about 2.0 L/D of mixing, and the 1.5 high shear mixing elements contribute about 1.0 L/D of mixing. This section has a total mixing L/D of about 4.0.

Straddling the end of the third mixing section and the start of the fourth mixing section is another 60 mm restriction ring assembly with cooperating on-screw elements having an L/D of about 1.0. Then, the remainder of the fourth mixing section are configured with five low shear mixing elements contributing a mixing L/D of about 3⅓. This section also has a total mixing L/D of about 4.

A mixture of 27.4% dusted ground butyl rubber (75% butyl rubber dusted with 25% calcium carbonate), 14.1% lower softening terpene resin (softening point=85° C.), 14.4% higher softening terpene resin (softening point=125° C.) and 44.1% calcium carbonate was fed at 24.6 lb/hr into the first large feed port.

A mixture of 73.5% low molecular weight polyvinyl acetate, 9.2% high molecular weight polyvinyl acetate, 8.6 lower softening terpene resin and 8.7% higher softening terpene resin was fed at ambient temperature, and 17.4 lb/hr, into the second large feed port. Polyisobutylene was also added at 3.5 lb/hr into this port.

A fat mixture, preheated to 83° C., was injected into the liquid injection ports in the third mixing section at a total rate of 14.5 lb/hr, with 50% of the mixture being fed through each port. The fat mixture included 0.2% BHT, 2.5% cocoa powder, 31.9% hydrogenated cottonseed oil, 19.8% glycerol monostearate, 18.7% hydrogenated soybean oil, 13.7% lecithin, and 13.2% partially hydrogenated cottonseed oil.

Mixing was continued through the fourth section with no further ingredient additions to yield a gum base which was used immediately to manufacture a peppermint flavored sugar gum.

The four section temperatures were set (in ° F.) at 350, 350, 110 and 25, respectively. The mixing screw temperature was set at 101° F. The temperatures of product in each of the four sections were measured at steady state (in ° F.) as 320, 280, 164, and 122, respectively. The screw rotation was 63 rpm.

EXAMPLE NO. 5

Referring to FIG. 7, a differential scanning calorimeter graph is illustrated of heat capacity versus temperature of low molecular weight polyvinyl acetate. As illustrated, due to the thermal capacity of the polyvinyl acetate between 30 and 75° C., a large amount of heat is absorbed at this temperature.

By way of example, and not limitation, a further example of the present invention will be illustrated. Chewing gum components set forth below in Table 1 were added to a Buss extruder.

TABLE 1

120 F. product temp.
100 mm Extruder, 19 l/d
screw profile #8
55 rpm
4.6 kW load

| FEED | FEED LOCATION | TEMP (C.) | RATE (lb/hr) |
|---|---|---|---|
| Base | | | |
| Rubber #1 | Port #1 | 24 | 5.1 |
| Resin #1 | Port #1 | 24 | 5 |
| Resin #2 | Port #1 | 24 | 5 |
| Filler #1 | Port #1 | 24 | 12.5 |
| PVAC | Port #2 | 24 | 14.4 |
| Low MW Rubber | Port #2 | 104 | 3.5 |
| Fats (Gum #1) | Zone #3, inject in 1st pin | 80 | 7.3 |
| Fats (Gum #1) | Zone #3, inject in last pin | 80 | 7.2 |
| Glycerin | Zone #5, inject before port | 23 | 3.9 |
| Sugar | Port #5 | 24 | 171.8 |
| Dextrose | Port #5 | 24 | 31.3 |
| Glucose | Zone #5, inject after port | 30 | 30 |
| Flavor | Zone #5, inject in last pin | 24 | 3 |
| | | Throughout | 300 |

Figure 8:
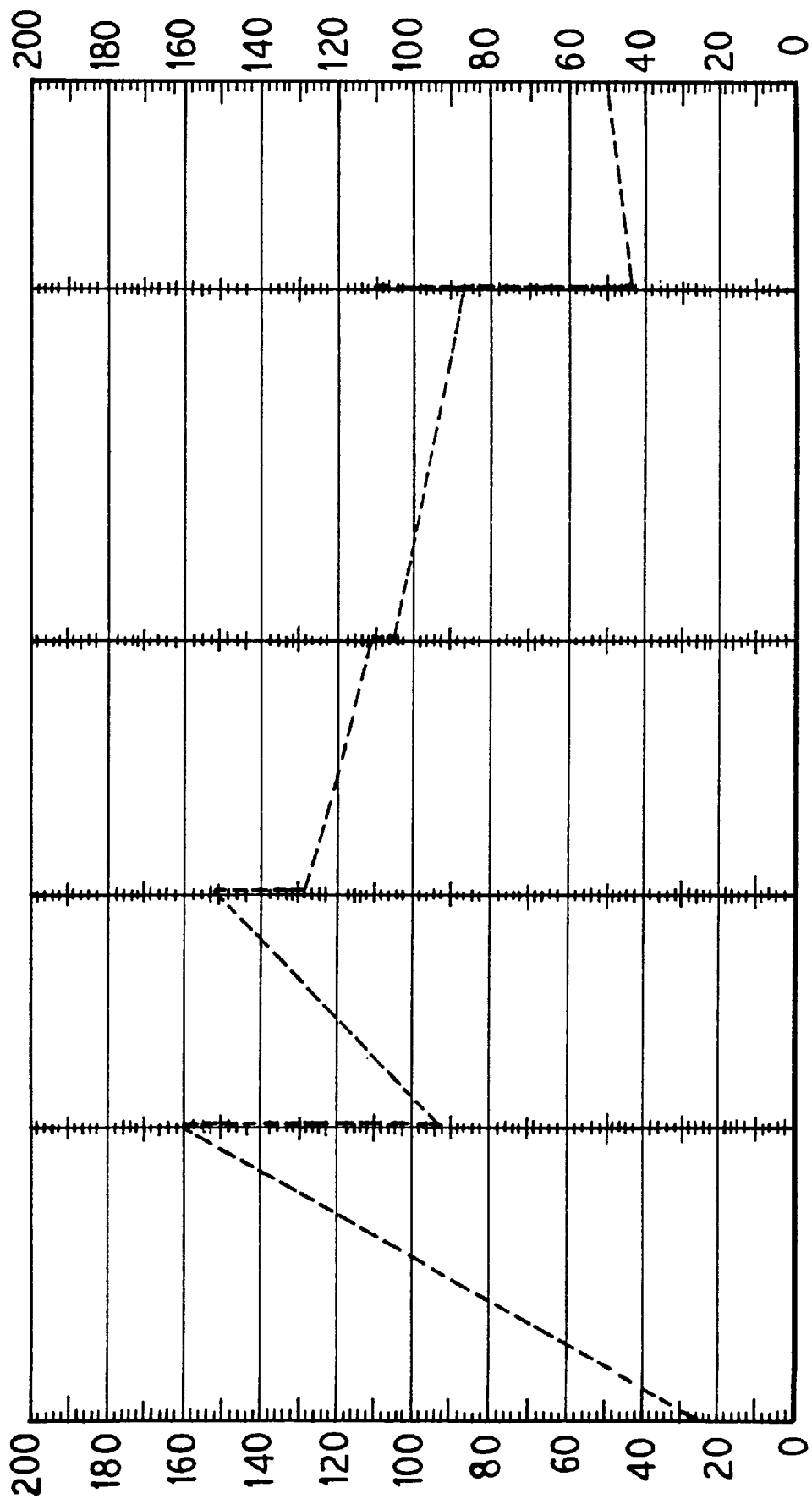
FIG. 8 depicts an approximation of material temperatures in an extruder as discussed in Example 5.

FIG. 8, illustrates an approximation of the material temperatures within the Buss extruder processing the product set forth above in Table 1 above. The vertical lines designate beginning and end points. The temperature at the end of each section is measured with a thermocouple.

The drop in temperature at the beginning of each section is calculated from ingredient addition rates, temperatures, and heat capacities.

As can be determined from Table 1 above, most of the temperature drop at the beginning of the second section is due to the addition of 25° C. polyvinyl acetate at that point. If this material had not been so effectively cooled, temperatures in the second section would have risen to an unacceptable region above 180° C. In this regard, it should be noted that temperatures of 190° C. to 200° C. and higher can be very damaging.

In FIG. 8, temperature drops are calculated from the data of Table No. 1 above. It should be noted that the port 2 additions included 14.4 lbs/hr of polyvinyl acetate at 24° C. and 3.5 lb/hr of polyisobutylene at 104° C. Polyvinyl acetate was responsible for the entire temperature drop at the beginning of Section 2.

It should be appreciated that the methods of the present invention are capable of being incorporated in the form of a variety of embodiments, only a few of which have been illustrated and described above. The invention may be embodied in other forms without departing from its spirit or essential characteristics. It will be appreciated that the addition of some other ingredients, process steps, materials or components not speciticaly included will have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A method for producing gum base comprising the steps of:
   adding to an extruder that includes at least a first and second mixing zone ingredients necessary to make a desired gum base;
   adding to the extruder polyvinyl acetate at a temperature that is not greater than approximately ambient temperature; and
   continuously creating a gum, base.

2. The method of claim 1 wherein the polyvinyl acetate is added before the second mixing zone.

3. The method of claim 1 wherein the extruder includes a first dispersive mixing zone and the solid polyvinyl acetate is added at the first dispersive mixing zone.

4. The method of claim 1 wherein the extruder includes a first dispersive mixing zone and the solid polyvinyl acetate is added after the first dispersive mixing zone.

5. The method of claim 1 wherein the polyvinyl acetate is cooled before being added to the extruder.

* * * * *